(12) United States Patent
Craigen et al.

(10) Patent No.: US 11,760,373 B2
(45) Date of Patent: Sep. 19, 2023

(54) METHOD AND SYSTEM FOR SMART ROAD DEPARTURE WARNING AND NAVIGATION ASSIST IN INCLEMENT WEATHER WITH LOW VISIBILITY

(71) Applicant: GM GLOBAL TECHNOLOGY OPERATIONS LLC, Detroit, MI (US)

(72) Inventors: Tara Craigen, Nestleton (CA); Mohammadali Shahriari, Markham (CA); Reza Zarringhalam, Whitby (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 40 days.

(21) Appl. No.: 17/648,989

(22) Filed: Jan. 26, 2022

(65) Prior Publication Data
US 2023/0234600 A1    Jul. 27, 2023

(51) Int. Cl.
| | | |
|---|---|---|
| *B60W 50/14* | (2020.01) | |
| *B60W 30/02* | (2012.01) | |
| *B60W 40/02* | (2006.01) | |
| *B60W 50/00* | (2006.01) | |
| *G06V 20/56* | (2022.01) | |
| *B60W 30/12* | (2020.01) | |

(52) U.S. Cl.
CPC ............ *B60W 50/14* (2013.01); *B60W 30/12* (2013.01); *B60W 40/02* (2013.01); *B60W 50/0097* (2013.01); *G06V 20/588* (2022.01); B60W 2050/146 (2013.01); B60W 2555/20 (2020.02)

(58) Field of Classification Search
CPC ...... B60W 50/14; B60W 30/12; B60W 40/02; B60W 50/0097; B60W 2050/146; B60W 2555/20; G06V 20/588
See application file for complete search history.

(56) References Cited

U.S. PATENT DOCUMENTS

| | | | |
|---|---|---|---|
| 10,928,830 B1 * | 2/2021 | Tran ...................... G06N 3/045 |
| 2010/0002911 A1 * | 1/2010 | Wu ....................... B60W 30/12 |
| | | | 382/104 |
| 2012/0215377 A1 * | 8/2012 | Takemura ............. B60W 30/12 |
| | | | 701/1 |
| 2017/0234689 A1 * | 8/2017 | Gibson ............. B60W 60/0015 |
| | | | 701/25 |
| 2022/0042813 A1 * | 2/2022 | Ko ..................... G01C 21/3658 |
| 2022/0212678 A1 * | 7/2022 | Eisenmann ......... B60W 40/105 |

* cited by examiner

*Primary Examiner* — Mohamed Barakat
(74) *Attorney, Agent, or Firm* — Lorenz & Kopf LLP

(57) ABSTRACT

A method of operating a vehicle of determining whether the vehicle is operating in a road segment with a low visibility condition to cause a loss of input of sensor data to a vehicle controller that operates an assist feature, activating one or more adaptive alerts based on a road departure risk of the vehicle, and driver use of the assist feature in the upcoming road segment, wherein the road departure risk is determined by calculating a road departure risk index that compares an estimated vehicle path based on the vehicle state data with a probabilistic vehicle path for the upcoming road segment; and predicting whether will operate within an acceptable path in the upcoming road segment; and tracking the vehicle in the upcoming road segment based on vehicle navigation data to provide at least one adaptive alert based on a prediction of the road departure risk.

20 Claims, 10 Drawing Sheets

METHOD AND SYSTEM FOR SMART ROAD DEPARTURE WARNING AND NAVIGATION ASSIST IN INCLEMENT WEATHER WITH LOW VISIBILITY

INTRODUCTION

The present disclosure generally relates to autonomous and semi-autonomous vehicles and more particularly relates to methods and systems for adaptive driver notifications in low visibility operating environment using positioning and risk index formulations to adapt lane departure warning and lane-keeping assist features based on driver use and preferences, vehicle states, and inclement weather conditions.

Advanced driver assistance systems (ADAS) capabilities such as lane departure warning, blind-spot detection, and the emergency braking are commonplace and provided by manufacturers today. Further, more advanced semi-autonomous ADAS (S-ADAS) and autonomous vehicles functionalities are in various stages of rollout by manufacturers and include capabilities of sensing and navigating a vehicular environment with little or no user input. Adverse weather creates challenges with ADAS features to which automated vehicles and drivers must respond.

Vehicle automation has been categorized into numerical levels ranging from Level Zero, corresponding to no automation with full human control, to Level Five, corresponding to full automation with no human control. Various automated driver-assistance systems, such as cruise control, adaptive cruise control, and parking assistance systems correspond to lower automation levels, while true "driverless" vehicles correspond to higher automation levels. Even though autonomous vehicles have made great advances in recent years, designers continue to seek improvements, particularly with respect to navigation functionality such as trajectory planning.

Accordingly, it is desirable to provide systems and methods that enable advanced adaptive driver notification based on road departure risks in inclement weather causing low visibility driving conditions leading to a loss of camera data to the vehicle controller that impacts driver assistance features such as lane departure warning and lane-keep assistance.

It is desirable to enable adaptive driver notification of driver-assist features based on driver preferences, vehicle states, and operating environment conditions when actuating or using autonomous or semi-autonomous modes of vehicular operations, particularly driver notification methods and systems that address losses of input of sensor data in inclement weather driving conditions.

Furthermore, other desirable features and characteristics of the systems and methods will become apparent from the subsequent detailed description and the appended claims, taken in conjunction with the accompanying drawings and the foregoing technical field and background.

SUMMARY

A system is disclosed for providing adaptive notifications to a driver when operating a vehicle in a low visibility condition that causes a loss of input of vehicle camera, LiDAR or other sensory data that impacts engaged driver roadway departure warning and lane-keeping assistance features.

In at least one exemplary embodiment, a method for operating a vehicle is provided. The method includes receiving, by a processor, vehicle state data and vehicle environment data; in response to engaging of at least one assist feature of a vehicle, determining, by the processor, whether the vehicle is operating in an upcoming road segment with at least a low visibility condition based on the vehicle state data and the vehicle environment data to cause a loss of at least one input of sensor data to a vehicle controller that operates the at least one assist feature; in response to the loss of at least one input of sensor data, activating, by the processor, one or more adaptive alerts based on a road departure risk of the vehicle, and driver use of the at least one assist feature in the upcoming road segment, wherein the road departure risk is determined by: calculating a road departure risk index that compares an estimated vehicle path based on the vehicle state data with a probabilistic vehicle path for the upcoming road segment; and predicting whether the vehicle based on the vehicle state data and a difference in a predicted level of error formulated by a calculation of the road departure risk index will operate within an acceptable path in the upcoming road segment; and tracking, by the processor, the vehicle in the upcoming road segment based on vehicle navigation data to provide at least one adaptive alert of one or more adaptive alerts based on a prediction of the lane departure risk on the estimated vehicle path in the upcoming lane segment.

In at least one exemplary embodiment, the method includes calculating by the processor, the road departure risk index with the loss of at least one input of sensor data including image sensor data from a vehicle camera.

In at least one exemplary embodiment, the method includes estimating, by the processor, a road departure risk in an upcoming roadway segment based on the vehicle navigation data, the estimated vehicle path, and the vehicle state data with the loss of image sensor data from the vehicle camera caused by a weather condition.

In at least one exemplary embodiment, the method includes in response to determining of the low visibility condition, alerting, by the processor via the at least one adaptive alert of one or more adaptive alerts, for the avoidance of a road excursion action by the driver in the upcoming road segment.

In at least one exemplary embodiment, the method includes escalating, by the processor, at least one adaptive alert of one or more adaptive alerts based on calculations of the road departure risk index while operating in the upcoming road segment.

In at least one exemplary embodiment, the method includes systematically providing, by the processor, information via at least one adaptive alert about the road departure risk based on the road departure risk index in the upcoming roadway segment.

In at least one exemplary embodiment, the method includes wherein at least one adaptive alert includes at least one icon indicating activation of one or more adaptive alerts based on a road departure risk, and a low visibility mode of vehicle operation wherein the low visibility mode of vehicle operation includes the loss of input of image sensor data to the vehicle controller.

In at least one exemplary embodiment, the method includes wherein the vehicle navigation data includes global navigation satellite system (GNSS) data that includes data of at least roadway segment curvature.

In at least one exemplary embodiment, the method includes wherein at least one adaptive alert is configured when displayed to incorporate road condition information and to change when displayed in accordance with a road departure risk associated with at least a roadway surface condition.

In at least one exemplary embodiment, the method includes configuring, by the processor, at least one adaptive alert by a preference of the driver; and adjusting, by the processor, the at least one adaptive alert based on a perceived risk by the driver in an operating environment, and by the preference of the driver of a vehicle distance to a roadway edge in an upcoming roadway segment.

In at least one exemplary embodiment, the method includes displaying, by the processor, on a vehicle navigation display a location for stoppage of the vehicle until the low visibility condition is improved or the vehicle is no longer operating in a low visibility mode of vehicle operation.

In at least one exemplary embodiment, the method includes in response to determining the low visibility condition, notifying, by the processor via at least one adaptive alert, that the lane assist feature is not operable and presenting an option to enable a navigation vehicle guidance assist feature.

In another exemplary embodiment, a vehicle is provided. The vehicle includes at least one sensor that provides sensor data within a vehicle environment as vehicle environment data and about a vehicle state as vehicle state data; and a controller that, with a processor and based on the sensor data, is configured to: receive the vehicle state data and the vehicle environment data; determine, in response to engagement of at least one assist feature of the vehicle, whether the vehicle is operating in an upcoming road segment with at least a low visibility condition based on the vehicle state data and the vehicle environment data to cause a loss of at least one input of sensor data to a vehicle controller that operates the at least one assist feature; activate, in response to the loss of at least one input of sensor data, one or more adaptive alerts based on a road departure risk of the vehicle, and driver use of the at least one assist feature in the upcoming road segment, wherein the road departure risk is determined by calculating a road departure risk index that compares an estimated vehicle path based on the vehicle state data with a probabilistic vehicle path for the upcoming road segment, and predict whether the vehicle based on the vehicle state data and a difference in a predicted level of error formulated by a calculation of the road departure risk index will operate within an acceptable path in the upcoming road segment; and track the vehicle in the upcoming road segment based on vehicle navigation data to provide at least one adaptive alert of one or more adaptive alerts based on a prediction of the road departure risk on the estimated vehicle path in the upcoming road segment.

In at least one exemplary embodiment, the vehicle includes wherein the controller is configured to: calculate the road departure risk index with the loss of at least one input of sensor data including image sensor data from a vehicle camera.

In at least one exemplary embodiment, the vehicle includes wherein the controller is configured to: estimate a road departure risk in an upcoming roadway segment based on the vehicle navigation data, the estimated vehicle path, and the vehicle state data with the loss of image sensor data from the vehicle camera caused by a weather condition.

In at least one exemplary embodiment, the vehicle includes an alert via at least one adaptive alert of one or more adaptive alerts in response to a determination of the low visibility condition for the avoidance of a road excursion action by the driver in the upcoming road segment.

In at least one exemplary embodiment, the vehicle includes wherein the controller is configured to: escalate the at least one adaptive alert of one or more adaptive alerts based on calculations of the road departure risk index while operating in the upcoming road segment; and provide information via the at least one adaptive alert about the road departure risk based on the road departure risk index in the upcoming roadway segment.

In at least one exemplary embodiment, the vehicle includes wherein at least one adaptive alert includes at least one icon indicating activation of one or more adaptive alerts based on a road departure risk, and a low visibility mode of vehicle operation wherein the low visibility mode of vehicle operation includes the loss of input of image sensor data to the vehicle controller; wherein the vehicle navigation data includes global navigation satellite system (GNSS) data that includes data of at least roadway segment curvature; wherein the at least one adaptive alert is configured when displayed to incorporate road condition information and to change when displayed in accordance with the road departure risk associated with at least a roadway surface condition.

In at least one exemplary embodiment, the vehicle includes wherein the controller is configured to: configure at least one adaptive alert by a preference of the driver; and adjust the at least one adaptive alert based on a perceived risk by the driver in an operating environment, and by the preference of the driver of a vehicle distance to a roadway edge in an upcoming roadway segment.

In yet another exemplary embodiment, a system is provided. The system includes a processing unit disposed in a vehicle including one or more processors configured by programming instructions encoded on non-transient computer-readable media, the processing unit configured to: receive vehicle state data and vehicle environment data; determine, in response to engagement of at least one assist feature of the vehicle, whether the vehicle is operating in an upcoming road segment with at least a low visibility condition based on the vehicle state data and the vehicle environment data to cause a loss of at least one input of sensor data to a vehicle controller that operates the at least one assist feature; activate, in response to the loss of at least one input of sensor data, one or more adaptive alerts based on a road departure risk of the vehicle, and driver use of the at least one assist feature in the upcoming road segment, wherein the road departure risk is determined by calculating a road departure risk index that compares an estimated vehicle path based on the vehicle state data with a probabilistic vehicle path for the upcoming road segment, and predict whether the vehicle will operate within an acceptable path in the upcoming road segment; and track the vehicle in the upcoming road segment based on vehicle navigation data to provide at least one adaptive alert of one or more adaptive alerts based on a prediction of the road departure risk on the estimated vehicle path in the upcoming road segment.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
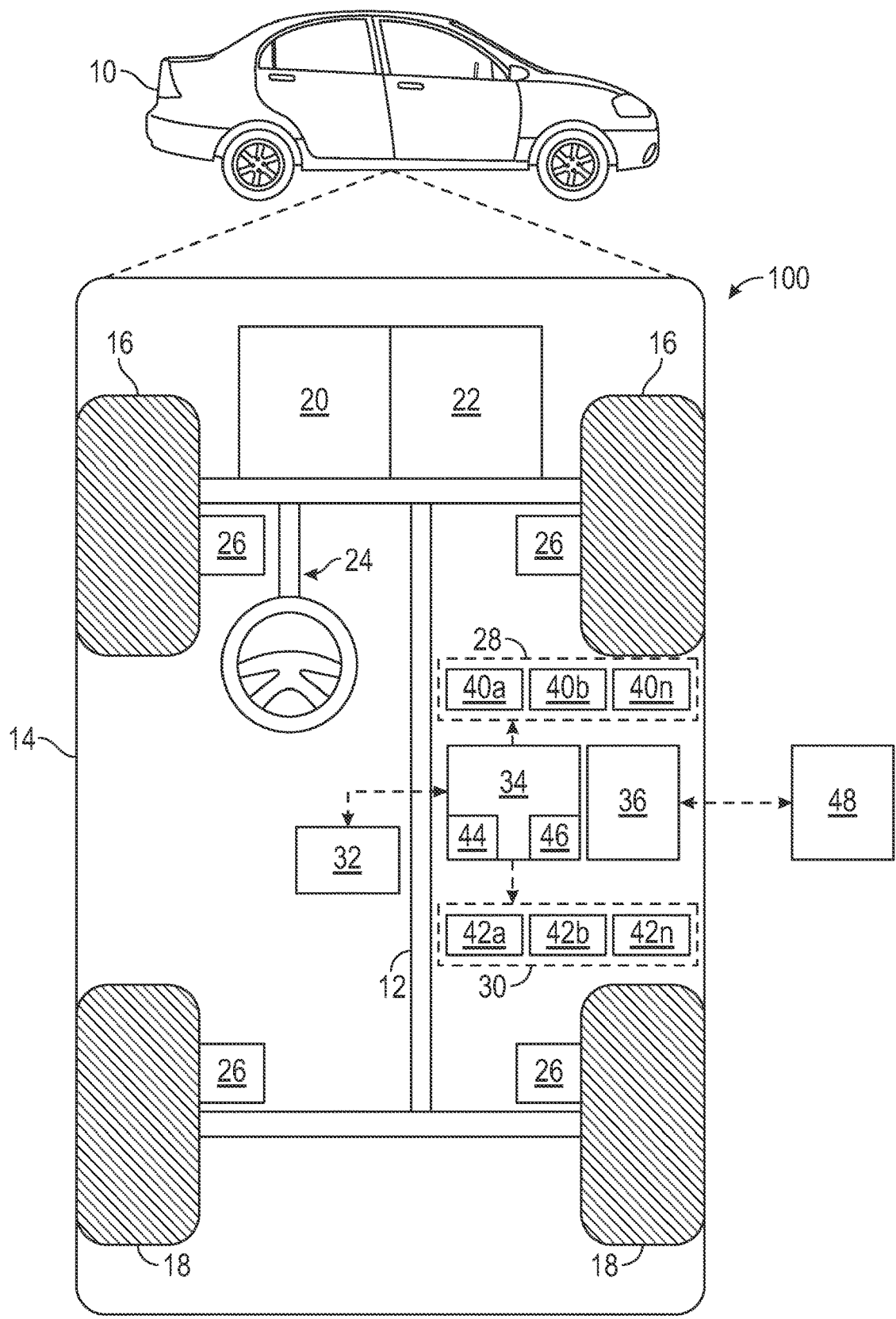
FIG. 1 illustrates a functional block diagram of an exemplary autonomous vehicle for use with the adaptive driver notification system, in accordance with various embodiments.

The following detailed description is merely exemplary in nature and is not intended to limit the application and uses. Furthermore, there is no intention to be bound by any expressed or implied theory presented in the preceding technical field, background, brief summary, or the following detailed description. As used herein, the term module refers to any hardware, software, firmware, an electronic control component, processing logic, and/or processor device, individually or in any combination, including without limitation: application-specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems and that the systems described herein are merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Weather conditions can affect ADAS's capabilities to sense the driving environment. For example, in low visibility driving scenarios (e.g., heavy fog, snowstorms) certain sensors such as camera and LiDAR may not be available to assist the driver causing some active safety features to not be enabled. It is desired to provide smart roadway departure warnings and road-keeping navigation assists in inclement weather and low visibility to reduce the risk of driving off the road, especially on high curvature sections of the road.

In exemplary embodiments, the present disclosure describes the methodology of the method of risk assessment for inclement weather conditions that enables the lane departure warning or lane keep assist feature to alert the driver and provide notification of possible road departure even when visibility is low and camera/LiDAR sensor inputs are not available. Also described is a process that enables escalation based on precise localization and mapping, driver state, vehicle state, and environmental conditions using the calculated time to road departure and risk index formula In exemplary embodiments, the present disclosure describes systems, methods, and apparatuses of an adaptive driver notification process that addresses driver assist feature availability when likely to be highly relied upon by the vehicle driver such as when operating the vehicle under poor visibility conditions and providing the driver with alert escalations of losses of the driver assist feature availability that is adjusted through calculations from a risk index formula based on a likely loss of input of sensed data caused by the poor visibility conditions. The adaptive alert notification process may be configured by systematically predicting vehicle actions of a road departure risk under inclement weather conditions that may result in enhanced driver ability to ensure vehicle safe operations combined with more state of mind comfort offered to the driver when operating the vehicle under such conditions.

In exemplary embodiments, the present disclosure describes systems, methods, and apparatuses of an adaptive driver notification process that incorporates communication back to the driver with displayed on-screen icons showing smart adaptive notification with road departure warning that incorporates communication back to the driver with an icon showing low visibility mode, incorporates (i.e., GOOGLE®, APPLE® map) vehicle mapping and GNSS for precise positioning as well as information on road curvature and bank angle, incorporates road conditions and adjusts alert notifications based on risk (visibility, weather, surface friction), learns driver preferences and adjusts inclement weather notifications based on perceived risk to environmental and dynamic factors such as desired distance to the road edge, indicates to the driver via navigation system and OnStar the location of the safest spot to pull over until visibility improves.

In exemplary embodiments, the present disclosure describes systems, methods, and apparatuses of an adaptive driver notification process that notifies the driver if the visibility is low and the vehicle camera cannot assist the driver in a lane-keeping functionality enabling the customer with the option to use the navigation assistance.

FIG. 1 illustrates a block diagram depicting an example vehicle 10 that may include a processor 44 that implements a lane-centering system 100. In general, input data is received in the lane centering system (or simply "system") 100. System 100 determines a process for blending hands-on steering of a vehicle path to transitioning to an automated hands-off lane-centering operation based on the input data received.

As depicted in FIG. 1, vehicle 10 generally includes a chassis 12, a body 14, front wheels 16, and rear wheels 18. Body 14 is arranged on chassis 12 and substantially encloses components of vehicle 10. Body 14 and chassis 12 may jointly form a frame. The vehicle wheels 16-18 are each rotationally coupled to the chassis 12 near a respective corner of the body 14. Vehicle 10 is depicted in the illustrated embodiment as a passenger car, but it should be appreciated that any other vehicle, including motorcycles, trucks, sport utility vehicles (SUVs), recreational vehicles (RVs), marine vessels, aircraft, etc., can also be used.

As shown, vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in this example, includes an electric machine such as a permanent magnet (PM) motor. The transmission system 22 is configured to transmit power from the propulsion system 20 to the vehicle wheels 16 and 18 according to selectable speed ratios.

The brake system 26 is configured to provide braking torque to the vehicle wheels 16 and 18. Brake system 26 may, in various exemplary embodiments, include friction brakes, brake by wire, a regenerative braking system such as an electric machine, and/or other appropriate braking systems.

The steering system 24 influences the position of the vehicle wheels 16 and/or 18. While depicted as including a steering wheel 25 for illustrative purposes, in some exemplary embodiments contemplated within the scope of the present disclosure, the steering system 24 may not include a steering wheel.

The sensor system 28 includes one or more sensing devices 40a-40n that sense observable conditions of the exterior environment and/or the interior environment of the vehicle 10 and generate sensor data relating thereto.

The actuator system 30 includes one or more actuator devices 42a-42n that control one or more vehicle features such as, but not limited to, the propulsion system 20, the transmission system 22, the steering system 24, and the brake system 26. In various exemplary embodiments, vehicle 10 may also include interior and/or exterior vehicle features not illustrated in FIG. 1, such as various doors, a trunk, and cabin features such as air, music, lighting, touchscreen display components, and the like.

The data storage device 32 stores data that can be used in controlling the vehicle 10. The data storage device 32 may be part of controller 34, separate from controller 34, or part of controller 34 and part of a separate system.

The controller 34 (i.e., vehicle controller) includes at least one processor 44 (integrate with system 100 or connected to the system 100) and a computer-readable storage device or media 46. The processor 44 may be any custom-made or commercially available processor, a central processing unit (CPU), a graphics processing unit (GPU), an application-specific integrated circuit (ASIC) (e.g., a custom ASIC implementing a neural network), a field-programmable gate array (FPGA), an auxiliary processor among several processors associated with the controller 34, a semiconductor-based microprocessor (in the form of a microchip or chipset), any combination thereof, or generally any device for executing instructions. The computer-readable storage device or media 46 may include volatile and non-volatile storage in read-only memory (ROM), random-access memory (RAM), and keep-alive memory (KAM), for example. KAM is a persistent or non-volatile memory that may be used to store various operating variables while processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which includes an ordered listing of executable instructions for implementing logical functions. The instructions, when executed by the processor 44, receive and process signals (e.g., sensor data) from the sensor system 28, perform logic, calculations, methods, and/or algorithms for automatically controlling the components of the vehicle 10, and generate control signals that are transmitted to the actuator system 30 to automatically control the components of the vehicle 10 based on the logic, calculations, methods, and/or algorithms. Although only one controller 34 is shown in FIG. 1, embodiments of the vehicle 10 may include any number of controllers 34 that communicate over any suitable communication medium or a combination of communication mediums and that cooperate to process the sensor signals, perform logic, calculations, methods, and/or algorithms, and generate control signals to automatically control features of the vehicle 10.

As an example, system 100 may include any number of additional sub-modules embedded within controller 34 which may be combined and/or further partitioned to similarly implement systems and methods described herein. Additionally, inputs to the system 100 may be received from the sensor system 28, received from other control modules (not shown) associated with the vehicle 10, and/or determined/modeled by other sub-modules (not shown) within the controller 34 of FIG. 1. Furthermore, the inputs might also be subjected to preprocessing, such as sub-sampling, noise-reduction, normalization, feature-extraction, missing data reduction, and the like.

An autonomous system may include a Level Four system which indicates "high automation", referring to the driving mode-specific performance by an automated driving system of all aspects of the dynamic driving task, even if a human driver does not respond appropriately to a request to intervene; and a Level Five system which indicates "full automation", referring to the full-time performance by an automated driving system of all aspects of the dynamic driving task under all roadway and environmental conditions that can be managed by a human driver.

Figure 2:
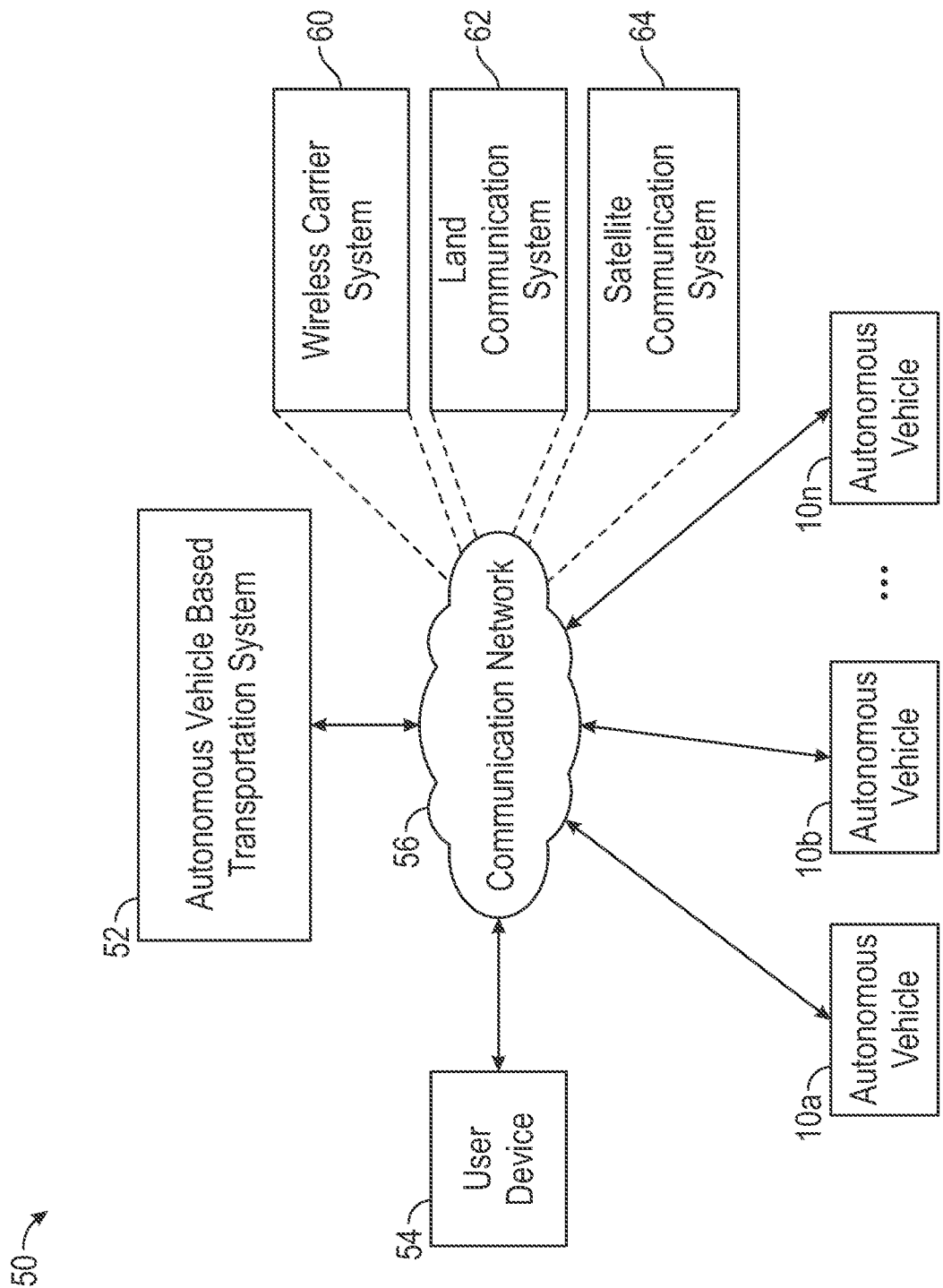
FIG. 2 illustrates a functional block diagram of a (backend communication) system having one or more autonomous vehicles of FIG. 1, in accordance with various embodiments.

FIG. 2 illustrates an exemplary embodiment of an operating environment shown generally at 50 that includes an autonomous vehicle-based remote transportation system 52 that is associated with one or more autonomous vehicles 10a-10n as described with regard to FIG. 1. In various embodiments, the operating environment 50 further includes one or more user devices 54 that communicate with the autonomous vehicle 10 and/or the remote transportation system 52 via a communication network 56.

The communication network 56 supports communication as needed between devices, systems, and components supported by the operating environment 50 (e.g., via tangible communication links and/or wireless communication links). For example, the communication network 56 can include a wireless carrier system 60 such as a cellular telephone system that includes a plurality of cell towers (not shown), one or more mobile switching centers (MSCs) (not shown), as well as any other networking components required to connect the wireless carrier system 60 with a land communications system. Each cell tower includes sending and receiving antennas and a base station, with the base stations from different cell towers being connected to the MSC either directly or via intermediary equipment such as a base station controller. The wireless carrier system 60 can implement any suitable communications technology, including, for example, digital technologies such as CDMA (e.g., CDMA2000), LTE (e.g., 4G LTE or 5G LTE), GSM/GPRS, or other current or emerging wireless technologies. Other cell towers/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from including the wireless carrier system 60, a second wireless carrier system in the form of a satellite communication system 64 can be included to provide uni-directional or bi-directional communication with the autonomous vehicles 10a-10n. This can be done using one or more communication satellites (not shown) and an uplink transmitting station (not shown). Uni-directional communication can include, for example, satellite radio services, wherein programming content (news, music, etc.) is received by the transmitting station, packaged for upload, and then sent to the satellite, which broadcasts the programming to subscribers. Bi-directional communication can include, for example, satellite telephony services using the satellite to relay telephone communications between vehicle 10 and the station. The satellite telephony can be utilized either in addition to or in lieu of the wireless carrier system 60.

A land communication system 62 may further be included that is a conventional land-based telecommunications network connected to one or more landline telephones and connects the wireless carrier system 60 to the remote transportation system 52. For example, the land communication system 62 may include a public switched telephone network (PSTN) such as that used to provide hardwired telephony, packet-switched data communications, and the Internet infrastructure. One or more segments of the land communication system 62 can be implemented through the use of a standard wired network, a fiber or other optical network, a cable network, power lines, other wireless networks such as wireless local area networks (WLANs), or networks providing broadband wireless access (BWA), or any combination thereof. Furthermore, the remote (transportation) system 52 need not be connected via the land communication system 62 but can include wireless telephony equipment so that it can communicate directly with a wireless network, such as the wireless carrier system 60.

Although only one user device 54 is shown in FIG. 2, embodiments of the operating environment 50 can support any number of user devices 54, including multiple user devices 54 owned, operated, or otherwise used by one person. Each user device 54 supported by the operating environment 50 may be implemented using any suitable hardware platform. In this regard, the user device 54 can be realized in any common form factor including, but not limited to: a desktop computer; a mobile computer (e.g., a tablet computer, a laptop computer, or a netbook computer); a smartphone; a video game device; a digital media player; a piece of home entertainment equipment; a digital camera or video camera; a wearable computing device (e.g., smartwatch, smart glasses, smart clothing); or the like. Each user device 54 supported by the operating environment 50 is realized as a computer-implemented or computer-based device having the hardware, software, firmware, and/or processing logic needed to carry out the various techniques and methodologies described herein. For example, user device 54 includes a microprocessor in the form of a programmable device that includes one or more instructions stored in an internal memory structure and applied to receive binary input to create binary output. In some embodiments, the user device 54 includes a GPS module capable of receiving GPS satellite signals and generating GPS coordinates based on those signals. In other embodiments, the user device 54 includes cellular communications functionality such that the device carries out voice and/or data communications over the communication network 56 using one or more cellular communications protocols, as are discussed herein. In various embodiments, the user device 54 includes a visual display, such as a touch-screen graphical display, or other display.

As can be appreciated, the subject matter disclosed herein provides certain enhanced features and functionality to what may be considered as a standard, a baseline, a semi-autonomous or an autonomous vehicle 10 and/or an autonomous vehicle-based remote transportation system 52. To this end, an autonomous vehicle and autonomous vehicle-based remote transportation system can be modified, enhanced, or otherwise supplemented to provide the additional features described in more detail below.

Figure 3:
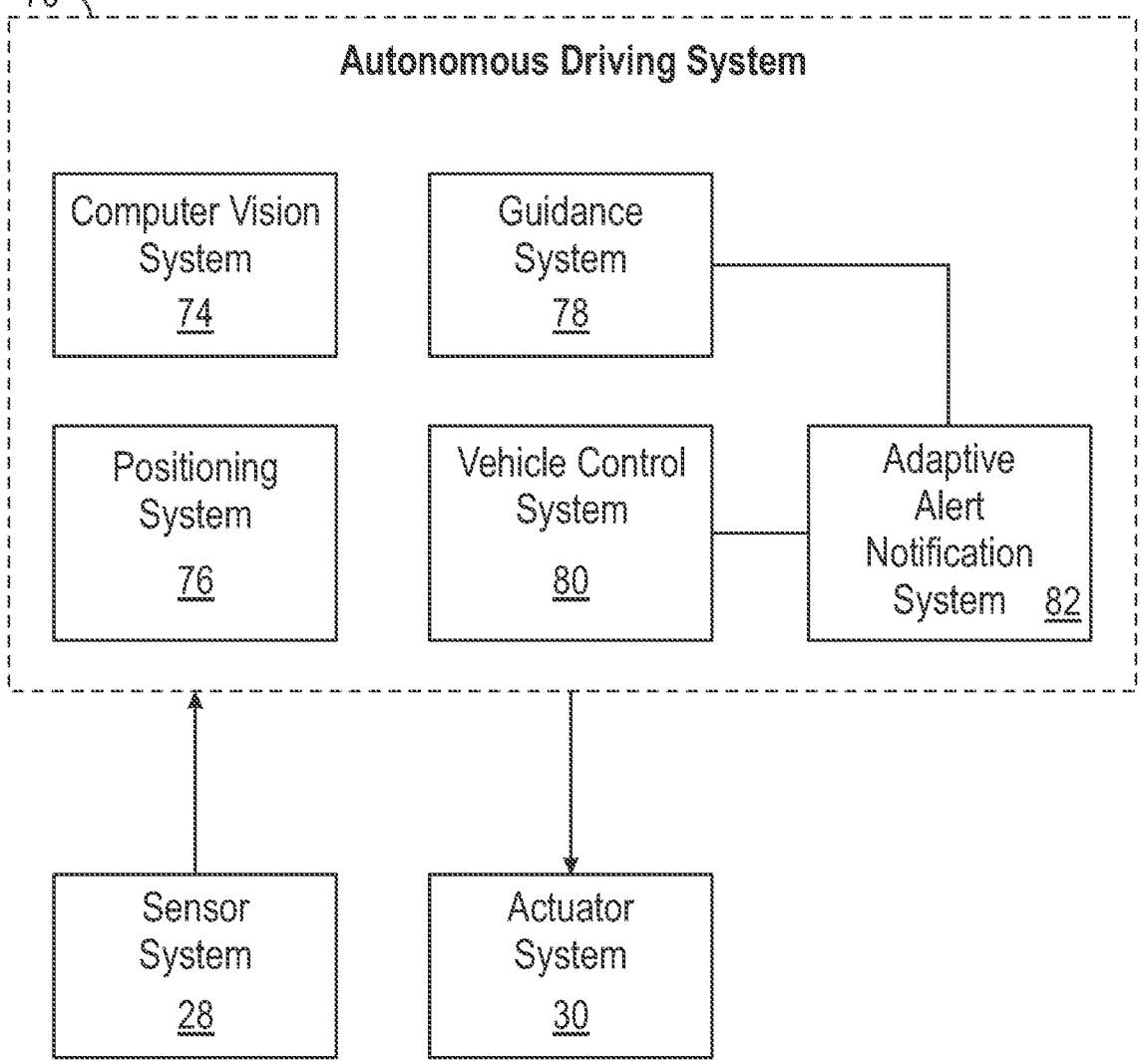
FIG. 3 illustrates an exemplary diagram of an autonomous driving system that includes the adaptive driver notification system of the autonomous vehicle, in accordance with various embodiments.

In accordance with various embodiments, controller 34 implements an autonomous driving system (ADS) 70 as shown in FIG. 3. That is, suitable software and/or hardware components of the controller 34 (e.g., the processor 44 and the computer-readable storage device or media 46) are utilized to provide an autonomous driving system 70 that is used in conjunction with vehicle 10.

In various embodiments, the instructions of the autonomous driving system 70 may be organized by function, module, or system. For example, as shown in FIG. 3, the autonomous driving system 70 can include a computer vision system 74, a positioning system 76, a guidance system 78, and a vehicle control system 80. The positioning system 76 may be in communication with an adaptive alert notification system 82 that implements various algorithms to provide a number of adaptive driver notifications of availability of driver-assist features that include predictions of a loss of input of vehicle sensor data caused by driving conditions. For example, the driving conditions may include weather-related conditions causing low visibility that can result in a loss of camera data input causing a likely dis-enablement (i.e., temporary de-activation in a near future such an upcoming roadway segment or lane segment) of driver-assist features such as lane-centering or lane/roadway departure warning of the vehicle's autonomous driving system 70 (or semi-autonomous driving systems). As can be appreciated, in various embodiments, the instructions may be organized into any number of systems (e.g., combined, further partitioned, etc.) as the disclosure is not limited to the present examples.

In various embodiments, the computer vision system 74 synthesizes and processes sensor data and predicts the presence, location, classification, and/or path of objects and features of the environment of the vehicle 10. In various embodiments, the computer vision system 74 can incorporate information from multiple sensors, including but not limited to cameras, lidars, radars, and/or any number of other types of sensors (including with loss of input of one sensor such as the camera sensor).

The positioning system 76 processes sensor data along with other data to determine a position (e.g., a local position relative to a map, an exact position relative to the lane of a road, vehicle heading, velocity, etc.) of the vehicle 10 relative to the environment. The guidance system 78 processes sensor data along with other data to determine a path for vehicle 10 to follow. The vehicle control system 80 generates control signals for controlling the vehicle 10 according to the determined path.

In various embodiments, controller 34 implements machine learning techniques to assist the functionality of controller 34, such as feature detection/classification, obstruction mitigation, route traversal, mapping, sensor integration, ground-truth determination, prediction and estimation of trajectories, and routes in upcoming road segments and the like.

The autonomous driving system 70 is configured to execute steering and speed control maneuvers, amongst other possible autonomous driving possibilities, to avoid collisions and to move cooperatively with tracked objects based in part on the control commands. The autonomous driving system 70 operates known autonomous vehicle control computer instructions through a processor-based in part on the control data, as described below with respect to FIG. 4.

Figure 4:
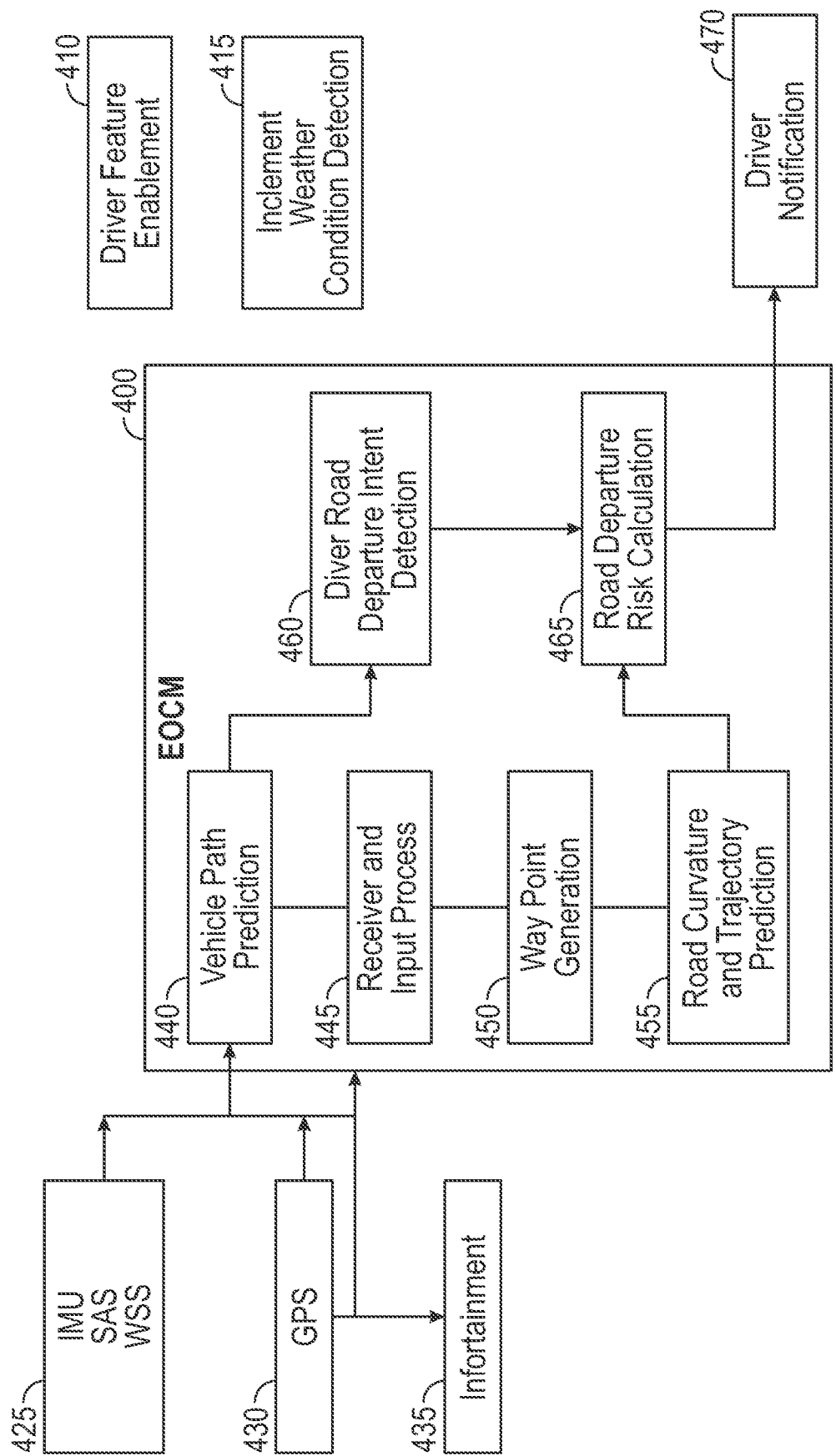
FIG. 4 illustrates an exemplary external object calculation module (EOCM) of the adaptive drive notification system in accordance with various embodiments.

FIG. 4 illustrates an exemplary external object calculation module (EOCM) that enables vehicle control actions with the adaptive driver notification system in accordance with various embodiments. In FIG. 4, system 70 further includes an external object calculation module (or "EOCM") 400. The EOCM 400 is a computer system or controller that may include, in general, components (not shown) such as a processor, a computer-readable memory, and interfaces.

In embodiments, as shown in FIG. 4, the EOCM 400 includes modules, and interfaces, a receiver and input process 445 via a High-Definition Map and Localization Module (HDLM), a waypoint generation module 450, road curvature, and the receiver and input process 455, a driver road departure intent detection module 460, and a road departure risk calculation module 465.

In embodiments, the EOCM 400 receives state and environmental vehicle data from a variety of vehicular sensors that include the sensor suite 425 of the inertial measurement unit (IMU), steering angle sensor (SAS), and wheel speed sensor (WSS), the Global Positioning System (GPS) 430, and navigation data over ethernet via the infotainment 435. Further, the EOCM 400 communicates signal data to the driver notification module 470 based on a formulation that calculates the lane (road) departure risk index without (at least) camera input and sends signal data to the driver notification module 470 to intelligently warn the driver to avoid road excursion in poor visibility conditions. In embodiments, the EOCM 400 includes other features that enable determination by software and algorithms of various driver features states of enablement 410, with predictions of risks such as road departure by sensed data of inclement weather condition detection 415.

In embodiments, the receiver and input process 455 updates a high fidelity map. For example, data from the sensor suite can be used to update a high fidelity map with information used to develop layers with waypoints identifying selected events, the locations of the event of loss of camera data, and the frequency with which the loss of camera data events are encountered at the identified location. In this way, sensor suite data of the autonomous vehicle can continually provide feedback to the mapping system and the high fidelity map (of the receiver and input process 445) can be updated as more and more information is gathered.

In embodiments, the vehicle path prediction module 440 implements intelligent algorithms for trajectory or path prediction modeling to predict the actual path of the operating vehicle based on sensed data from the sensor suite 425 that includes data related to vehicle lateral forces, wheel angles, wheel speed, and other vehicle dynamics.

In embodiments, the waypoint generation module 450 generates a target waypoint or several target waypoints for predicting vehicle trajectory, path, or route from the autonomous or semi-autonomous vehicle's current location to a target waypoint or a selected area. In some examples, the path may include several target waypoints and/or target areas that have a likelihood of input loss from a camera or other vehicle sensor when traversed by the operating autonomous or semi-autonomous vehicle.

In embodiments. the predicted or estimated vehicle path is based on the sensor data available from the sensor suite 325 (shown in FIG. 3) and the GPS 430 providing data of the current vehicle state data and location received using GNSS of road curvature and bank angle.

In embodiments, the driver road departure intent detection module 460 detects a probabilistic determination and not a determination of the vehicle path prediction.

In embodiments, the road departure risk calculation module 465 calculates the likelihood based on a formulation of the road departure risk at a waypoint, location, or curvature of the roadway.

Figure 5B:
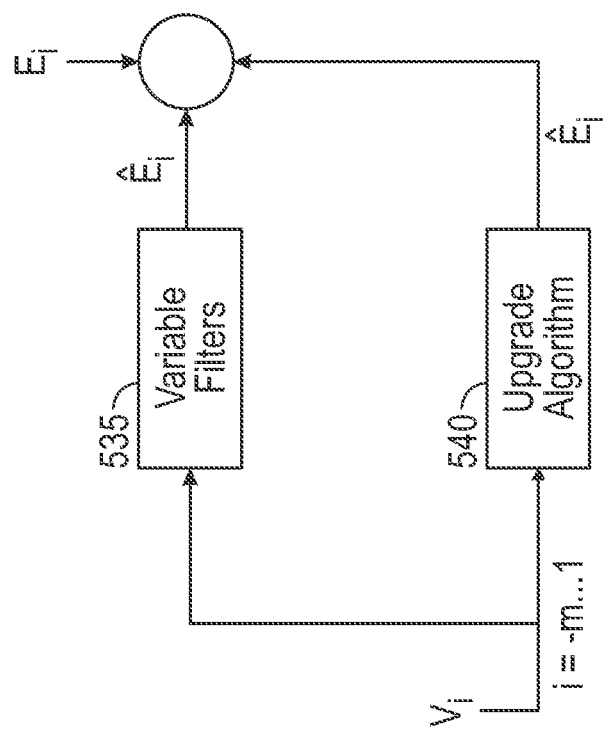
FIG. 5B illustrates a flow diagram of a reiterative step to determine an acceptable safe boundary for the predictive error to ensure the vehicle is within the defined bounded error of the adaptive driver notification system in accordance with various embodiments.
Figure 5A:
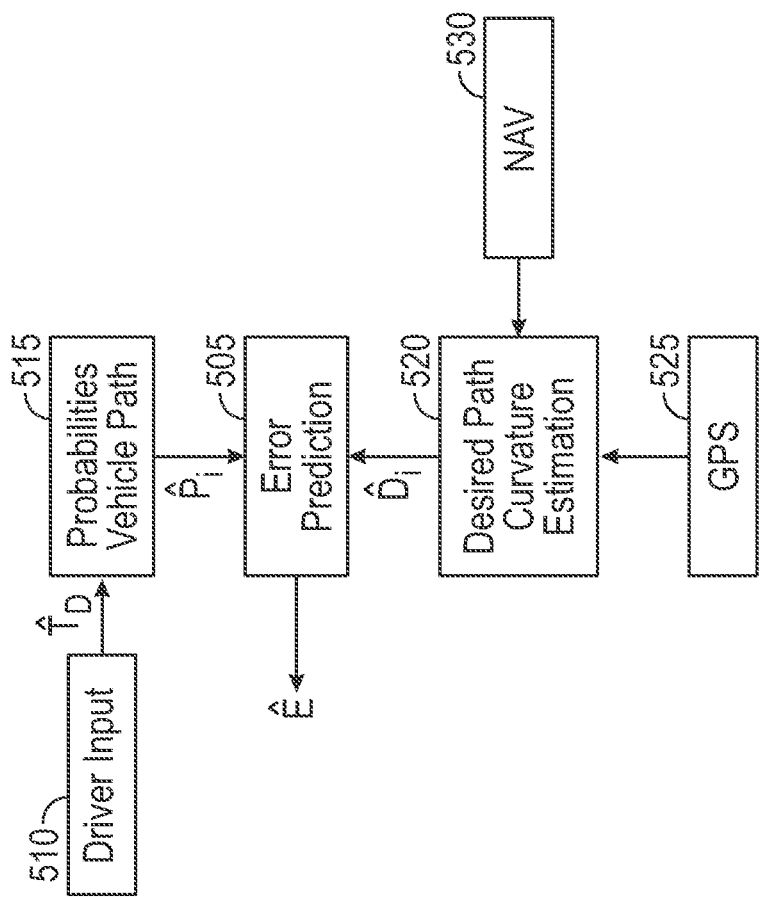
FIG. 5A illustrates a flow diagram of error prediction of the adaptive driver notification system in accordance with various embodiments.

FIG. 5A illustrates a flow diagram of error prediction of the adaptive driver notification system in accordance with various embodiments. In FIG. 5, the predictive error E that is generated at block 505 (i.e., the error prediction processer) by processing inputs from a probabilistic vehicle path prediction $$\hat{P}_i = \begin{bmatrix} x_i \\ y_i \\ \theta_i \end{bmatrix}, i = 1..$$

n at block 515 (i.e., probability vehicle path processor) based on driver input $\hat{\tau}_D$ at block 510, and from a desired path curvature estimation $\hat{D}_i$ at block 520 (i.e., path curvature estimator processor) based on GPS data from block 525 and NAV information from block 530. driver input. Other states of an estimated intended path (heading, curvature rate, etc.) also can be derived using a similar approach as described above for estimating the curvature of the roadway.

FIG. 5B illustrates a flow diagram of a reiterative step to determine an acceptable safe boundary for the predictive error to ensure the vehicle is within the defined bounded error of the adaptive driver notification system in accordance with various embodiments. In FIG. 5B, the variable filter operation at block 535, and the updated algorithm at block 540 defined the bounded error. Since there is uncertainty in the data in inclement weather conditions, it cannot be guaranteed that the error $e_i \to 0$; hence, an acceptable safe bound for error is determined via the variable filter operation and the update to the algorithm to ensure that the vehicle is operating within a bounded error or assuring $E < |\tilde{E}|$.

The algorithm for error prediction is defined as $\dot{\tilde{E}} = AE + B_1 u + B_2 g \sin(\theta_i) + B_3 \rho_D + \tilde{E}$ for calculating a road departure risk index based on $u_c = -K_c B_1^{-1}(|\tilde{E}|\mathrm{sign}(E))$ and $$u = \underbrace{-KE}_{FB} \underbrace{-\rho_D(K_{us} V_x^2 + L)}_{FF} \underbrace{+u_C}_{\text{Uncertainty measure}}$$

And the following (vehicle dynamic parameters) factors:

$\dot{V} = E(AE + B_1 u + B_2 g \sin(\theta_i) + B_3 \rho_D + \tilde{E})$ $u = -KE - \rho_D(K_{us} V_x^2 + L) + u_c$ $\dot{V} = -KE^2 + E(B_1 u_c + \tilde{E})$ In an exemplary embodiment, the virtual compensator is configured as $u_c = -K_c B_1^{-1}(|\tilde{E}|\mathrm{sign}(E))$.

In this case, then $\dot{V} = -KE^2 - K_c|E||\tilde{E}| < 0$. If virtual control parameter u is approximately zero, the driver is tracking the road profile, and when $|u| \gg 0$ this likely connotes or means the driver is not tracking the road's profile, thus causing a likelihood or risk of road departure.

In an embodiment, the parameters of the error prediction algorithm $\dot{\tilde{E}} = AE + B_1 u + B_2 g \sin(\theta_i) + B_3 \rho_D + \tilde{E}$ are updated and are defined as follows: $K_c$: design parameter—controller gain E: predictive error, A, $B_1$, $B_2$, $B_3$: Vehicle lateral dynamics parameters are as follows: u: vehicle road wheel angle, $\theta_i$: road bank angle, $\rho_D$: road curvature $\hat{D}_i$: desired path data from a navigation system, and $\hat{P}_i$: probabilistic vehicle path data.

Figure 5C:
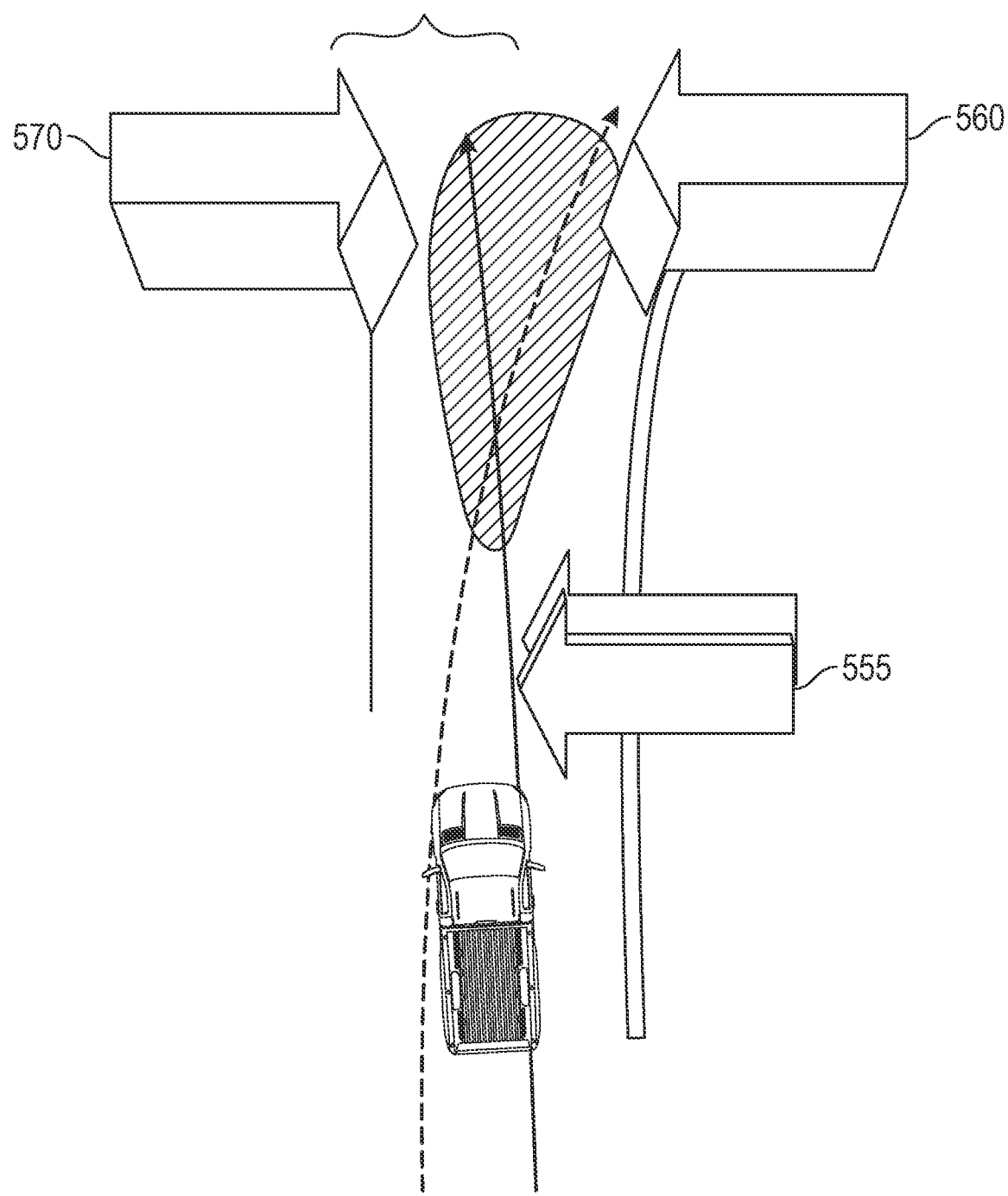
FIG. 5C illustrates an exemplary diagram of the historical data and the prediction horizon for a vehicle tracking and the probabilistic measure of the vehicle tracking of the adaptive notification system in accordance with various embodiments.

FIG. 5C illustrates an exemplary diagram of the historical data and the prediction horizon for a vehicle tracking and the probabilistic measure (as opposed to a deterministic measure) of the vehicle tracking of the adaptive notification system in accordance with various embodiments. The desired path curvature estimated is path 560 based on the updated algorithm $\dot{\tilde{E}} = AE + B_1 u + B_2 g \sin(\theta_i) + B_3 \rho_D + \tilde{E}$ and the probabilistic vehicle path prediction is path 570 with a region 555 of $$\hat{P}_i = \begin{bmatrix} x_i \\ y_i \\ \theta_i \end{bmatrix}, i = 1..n$$

for probabilistic path predictions. The uncertainty calculated is the difference between both paths that is compensated for by $u_c = -K_c B_1^{-1}(|\tilde{E}|\mathrm{sign}(E))$.

Figure 6A:
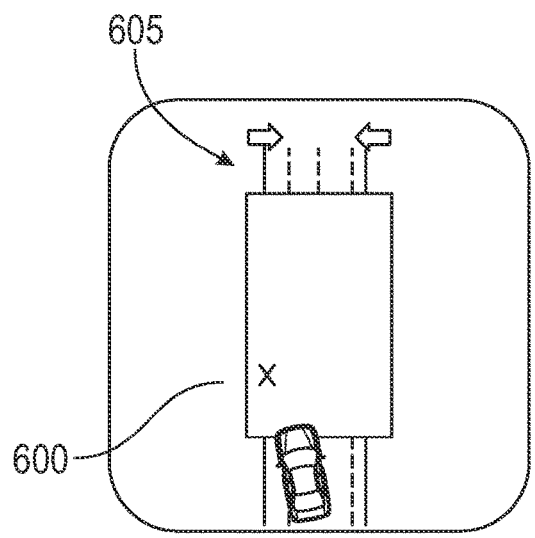
FIG. 6A illustrates an exemplary scenario of a use case of a low visibility event and a risk factor caused by surface friction of the adaptive driver notification system in accordance with an exemplary embodiment.

FIG. 6A depicts an exemplary scenario of a use case of a low visibility event and a risk factor caused by surface friction of the adaptive driver notification system in accordance with an exemplary embodiment. In FIG. 6A, in the use scenario depicted, the road edge and road marking in scenario 605 are obscured by inclement weather such as snow, fog, and heavy rain, causing a probabilistic path prediction 600 based on the risk factors incorporated of edges and marking obscured in the risk index formula.

Figure 6B:
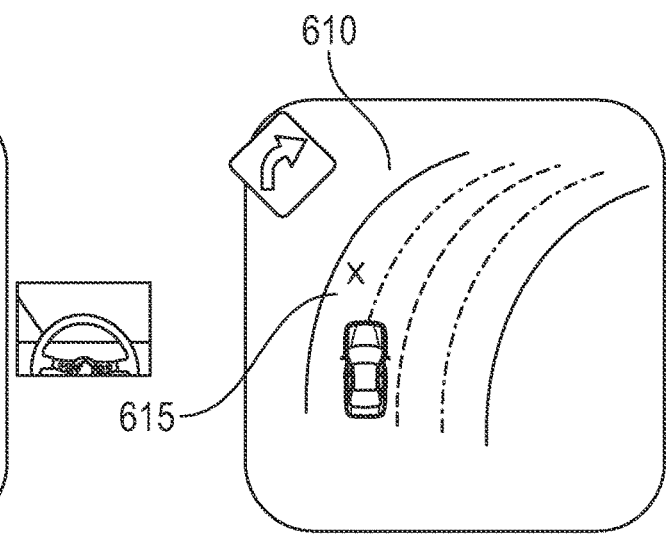
FIG. 6B illustrates an exemplary scenario of a use case of a low visibility event and a risk factor caused by high road curvature of the adaptive driver notification system in accordance with an exemplary embodiment.

FIG. 6B depicts an exemplary scenario of a use case of a low visibility event and a risk factor caused by high road curvature of the adaptive driver notification system in accordance with an exemplary embodiment. In FIG. 6B, in the use scenario depicted, the road edge is not detectable due to the high road curvature (the steep bank of the roadway may also be a factor) in scenario 610 causing a probabilistic path prediction 615 based on the risk factors incorporated of road edge not being detectable in the risk index formula.

Figure 6C:
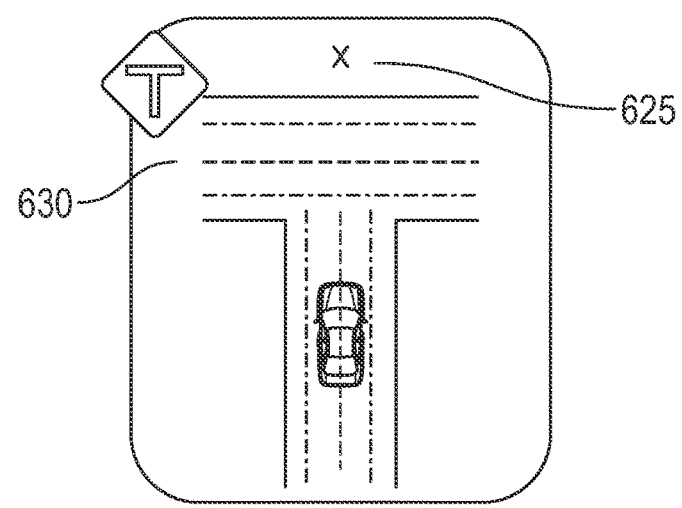
FIG. 6C illustrates an exemplary scenario of a use case of a low visibility event and a risk factor caused by sudden ending of the roadway of the adaptive driver notification system in accordance with an exemplary embodiment.

FIG. 6C depicts an exemplary scenario of a use case of a low visibility event and a risk factor caused by sudden road ending of the adaptive driver notification system in accordance with an exemplary embodiment. In FIG. 6C, in the use scenario depicted, the road edge is not detectable due to the T-shaped intersection in scenario 630 causing a probabilistic path prediction 625 based on the risk factors incorporated of road edge not being detectable in the risk index formula.

In embodiments, the road trajectory and probabilistic path prediction can be shown in a heads-up display (HUD), and a voice-over can also be implemented. Both features may also be user touch selectable for actuation using various on-board actuation buttons for displaying the HUD, voice notifications, and other visual and audible notifications with the adaptive driver notification system.

Figure 7:
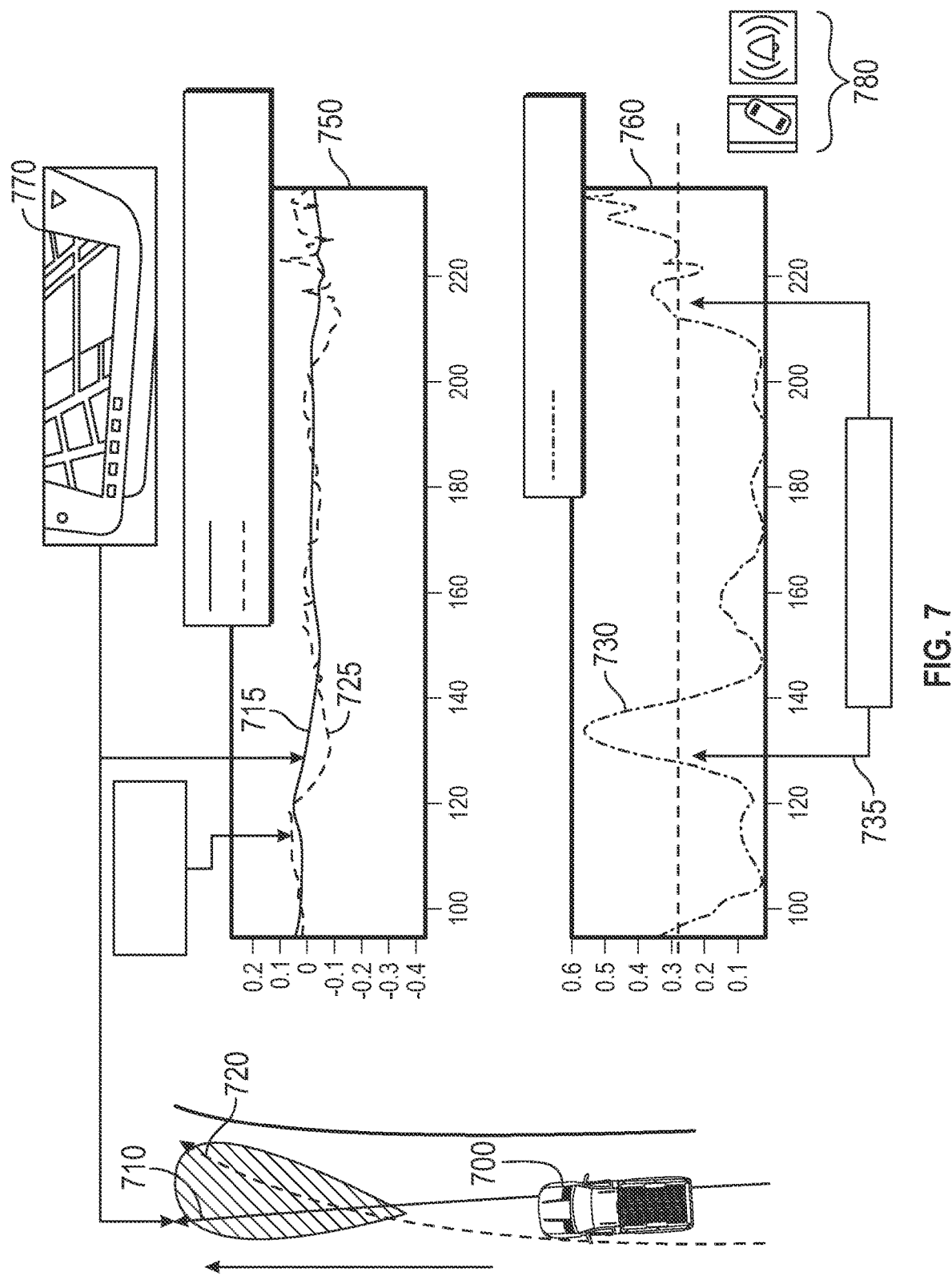
FIG. 7 illustrates an exemplary set of graphs that depict comparisons of an upcoming road curvature to the vehicle path prediction and the road departure risk calculated based on the risk index formula of the adaptive driver notification system in accordance with various embodiments.

FIG. 7 illustrates an exemplary set of graphs that depict comparisons of an upcoming road curvature to the vehicle path prediction and the road departure risk calculated based on the risk index formula of the adaptive driver notification system in accordance with various embodiments. In FIG. 7, the vehicle 700 is shown operating in an upcoming road curvature and the path 710 of the desired vehicle path based on the estimations of the upcoming curvature using NAV information compared with a predicted vehicle path curvature 720 based on the risk index formula. Graph 760 depicts comparisons of the estimated upcoming curvature 715 of the roadway based on GPS data to the predicted vehicle path curvature 725 based on the risk index formula. Graph 760 depicts the road departure risk 730 that is calculated in comparison to the vehicle states and dynamics depicted in graph 750 of estimations of the road curvature and predictions of the vehicle path. The road departure risk in graph 760 is shown to be greatest at approximately a time of 130 seconds at 735 from the current vehicle position based on data about the vehicle state and dynamics received by the adaptive driver notification system and calculations based on the risk index formula and environment factors. A mapping display 770 is depicted that may be available to the driver of the predicted paths and estimated road path curvature, as well as audible or visual notifications 780 that are tied and escalated in accordance with the road departure risk amounts of graph 760.

Figure 8:
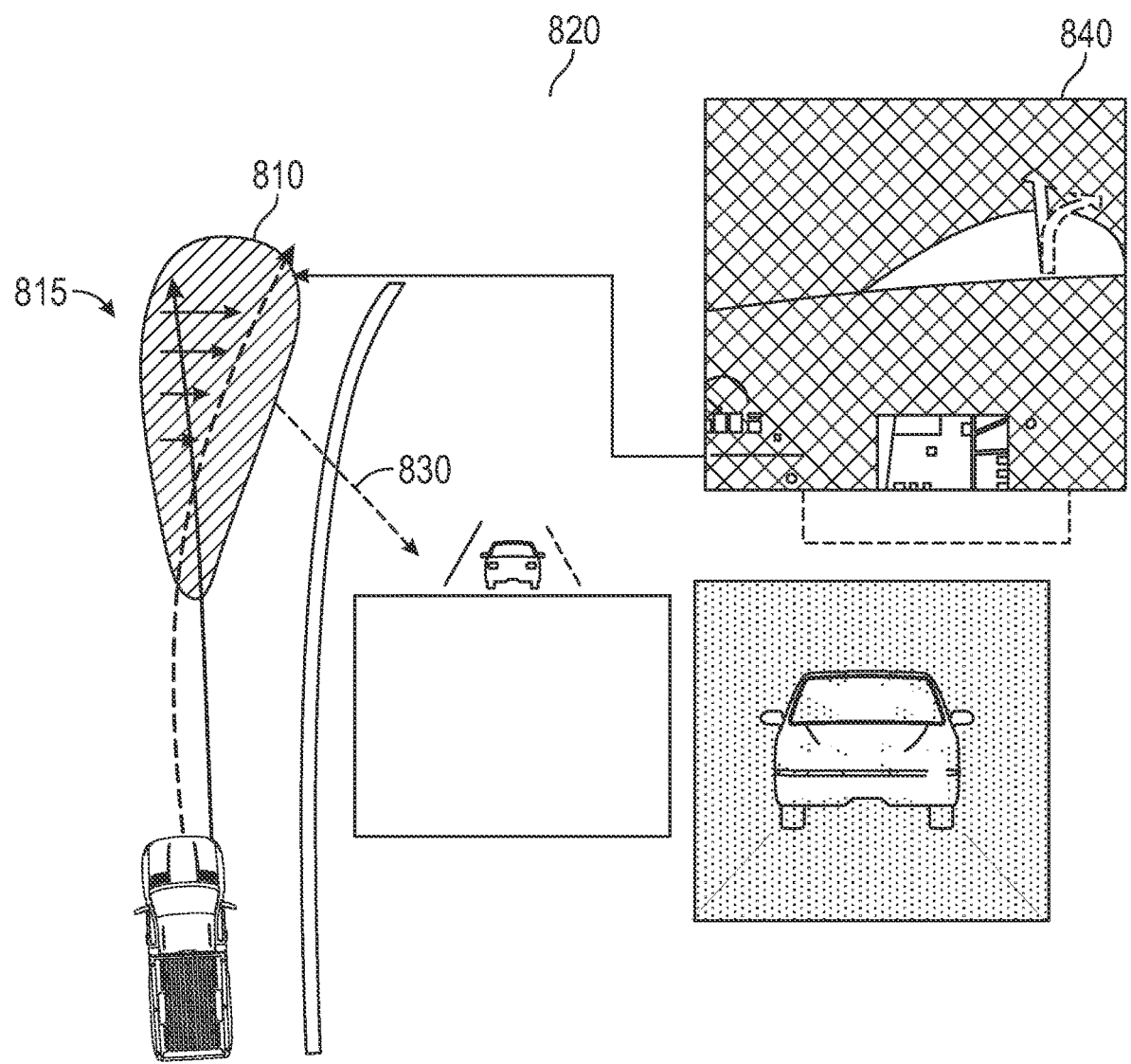
FIG. 8 is an exemplary diagram of the estimated predicted error with driver feedback and display on a heads-up display of the adaptive driver notification system in accordance with various embodiments.

FIG. 8 is an exemplary diagram of the estimated predicted error with driver feedback and display on a heads-up display of the adaptive driver notification system in accordance with various embodiments. In FIG. 8, the predictive error 810 is shown with the estimated vehicle path 815 based on vehicle states to the desired path 820 from the NAV feedback for the oncoming curvature, and driver feedback 830 through notifications of use of features for lane-keeping assist and curve ahead warnings on the map and a corresponding HUD 840 of both paths to the driver view.

Figure 9:
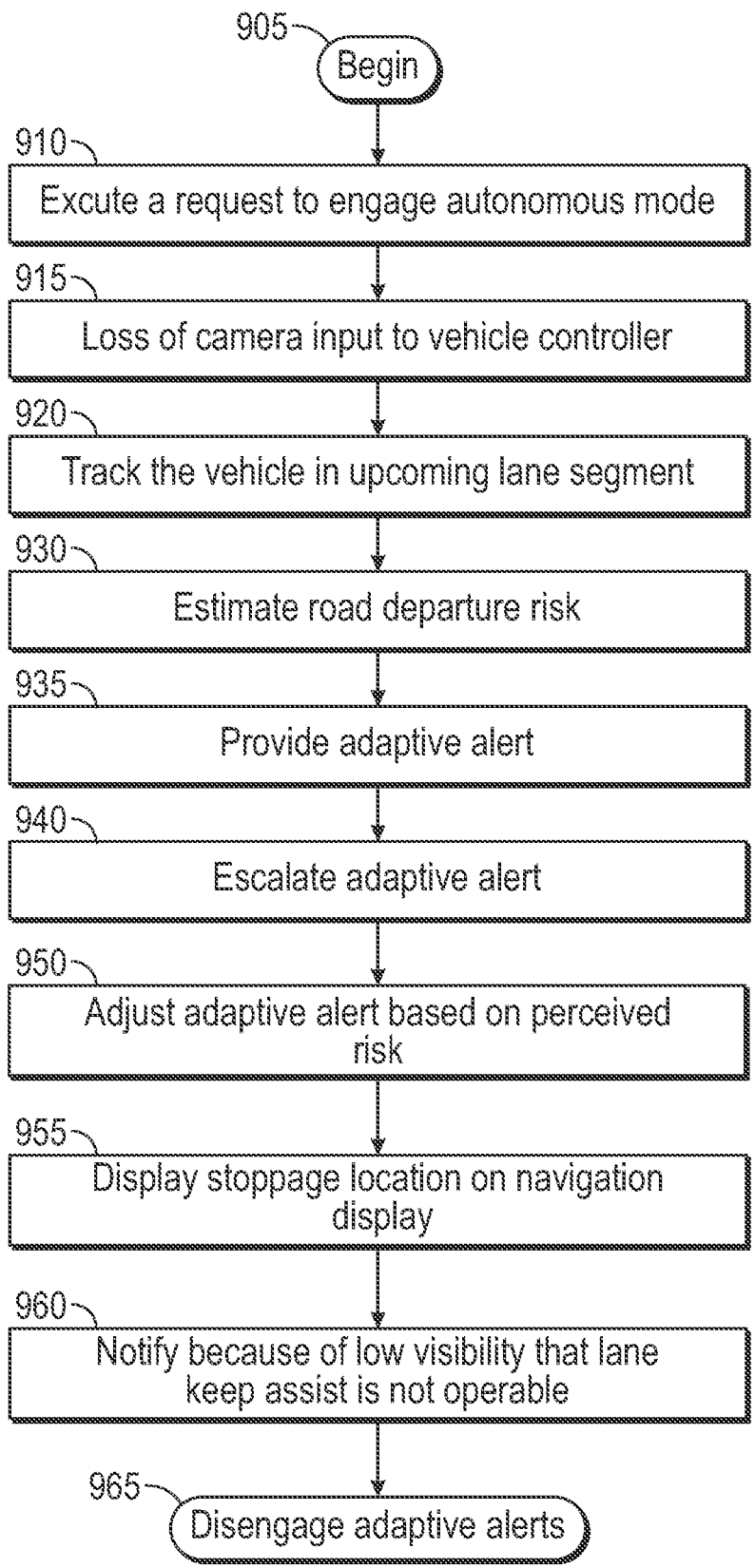
FIG. 9 is an exemplary flowchart of the process for calculating the road departure risk index without camera input, and calculations of the estimated vehicle path and desired path using navigation data and vehicle dynamics and generating intelligent warnings of the adaptive driver notification system in accordance with various embodiments.

FIG. 9 is an exemplary flowchart of the process for calculating the road departure risk index without camera input, and calculations of the estimated vehicle path and desired path using navigation data and vehicle dynamics and generating intelligent warnings of the adaptive driver notification system in accordance with various embodiments. As can be appreciated in light of the disclosure, the order of operation within the method is not limited to the sequential execution as illustrated in FIG. 9 but may be performed in one or more varying orders as applicable and in accordance with the present disclosure. In various embodiments, the method can be scheduled to run based on one or more predetermined events (such as the loss of an input of sensor data), and/or can run continuously during the operation of vehicle 10.

The method may begin at 905. At step 910, the driver executes a request to engage the autonomous mode for the autonomous operation of the vehicle. At the time of the driver's request, in step 910, the vehicle may be entering a curvature of a roadway and/or experiencing inclement weather conditions that result in a low visibility type scenario in which the driver is likely to rely on driver-assist features such as lane departure warning or lane keep assist features based on driver-based operating preferences, the driver state, the vehicle state, and the current environment condition. In embodiments, the driver may be operating the vehicle in an autonomous or semi-autonomous driving mode or such mode may be desired to be activated (e.g., prior to entering a curved roadway segment).

At step 910, a driver after engaging a driver assist lane-keeping or lane departure warning feature, a suite of vehicle sensors provides to a vehicle controller vehicle state data and vehicle environment data. The vehicle controller is configured to determine whether the vehicle is operating in an upcoming road segment with inclement weather that causes a low visibility condition based on the vehicle state data and the vehicle environment data. This may cause a loss of at least one input of sensor data to a vehicle controller that operates at least one assist feature such as a lane assist keeping feature or departure warning feature.

At step 915, in response to the loss of at least one input of sensor data to the vehicle controller, the system is activated and may consist of a set of adaptive alerts based on a road departure risk of the vehicle, and driver use of at least one assist feature in the upcoming road segment. The road departure risk is determined by the adaptive driver notification system (hereinafter the "system") calculating a road departure risk index that compares an estimated vehicle path based on the vehicle state data with a probabilistic vehicle path for the upcoming road segment, and predicting whether the vehicle based on the vehicle state data and a difference in a predicted level of error formulated by a calculation of the road departure risk index will operate within an acceptable path in the upcoming road segment. At step 920, the vehicle controller tracks the vehicle in the upcoming road segment based on vehicle navigation data to provide by the system at least one adaptive alert based on a prediction of the road departure risk on the estimated vehicle path in the upcoming road segment.

At step 925, the vehicle controller is configured to calculate via the system the road departure risk index with the loss of at least one input of sensor data such as image sensor data from a vehicle camera. At step 930, the vehicle controller estimates via the system a road departure risk in an upcoming roadway segment based on the vehicle navigation data, the estimated vehicle path, and the vehicle state data with the loss of image sensor data from the vehicle camera caused by a weather condition.

At step 935, the vehicle controller in response to determining the low visibility condition causes the system to provide at least one adaptive alert for the avoidance of a road excursion action by the driver in the upcoming road segment.

At step 940, the system escalates at least one adaptive alert of one or more, or a plurality of adaptive alerts based on calculations of the road departure risk index while operating in the upcoming road segment.

At step 945, the system systematically provides information via at least one adaptive alert about the road/lane departure risk based on the road departure risk index in the upcoming roadway segment. At least one adaptive alert can be configured to include at least one icon indicating activation of one or more adaptive alerts based on a road/lane departure risk, and a low visibility mode of vehicle operation wherein the low visibility mode of vehicle operation includes the loss of input of image sensor data to the vehicle controller. The vehicle navigation data includes global navigation satellite system (GNSS) data that includes data of at least roadway segment curvature. At least one adaptive alert is configured when displayed to incorporate road condition information and to change when displayed in accordance with a road departure risk associated with at least a roadway surface condition.

At step 950, the system is configured to enable at least one adaptive alert by a preference of the driver; and is adjusted to the at least one adaptive alert based on a perceived risk by the driver in an operating environment, and by the preference of the driver of a vehicle distance to a roadway edge in an upcoming roadway segment.

At step 955, the system is configured to display on a vehicle navigation display a location for stoppage of the vehicle until the low visibility condition is improved or the vehicle is no longer operating in a low visibility mode of vehicle operation.

At step 960, in response to determining the low visibility condition, the system is configured to notify via at least one adaptive alert, that the lane assist feature is not operable and presenting an option to enable a navigation vehicle guidance assistance feature to compensate for the loss of the lane-keeping assist or roadway departure warning functions.

At step 965, once the low visibility condition is passed, or the weather improves so that the camera input is no longer lost to the vehicle controller, the system is configured to enable an action to automatically disengage, and the driver may be notified of the changed state of the vehicle assist functions and the outside condition that is no longer causes a low visibility mode of vehicle operation.

The foregoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

While at least one exemplary aspect has been presented in the foregoing detailed description of the invention, it should be appreciated that a vast number of variations exist. It should also be appreciated that the exemplary aspect or exemplary aspects are only examples, and are not intended to limit the scope, applicability, or configuration of the invention in any way. Rather, the foregoing detailed description will provide those skilled in the art with a convenient road map for implementing an exemplary aspect of the invention. It is understood that various changes may be made in the function and arrangement of elements described in an exemplary aspect without departing from the scope of the invention as set forth in the appended claims.

What is claimed is:

1. A method, comprising:
   receiving, by a processor, vehicle state data and vehicle environment data;
   in response to engaging of at least one assist feature of a vehicle, determining, by the processor, whether the vehicle is operating in an upcoming road segment with at least a low visibility condition based on the vehicle state data and the vehicle environment data to cause a loss of at least one input of sensor data to a vehicle controller that operates the at least one assist feature;
   in response to the loss of at least one input of sensor data, activating, by the processor, one or more adaptive alerts based on a road departure risk of the vehicle, and driver use of the at least one assist feature in the upcoming road segment, wherein the road departure risk is determined by:
      calculating a road departure risk index that compares an estimated vehicle path based on the vehicle state data with a probabilistic vehicle path for the upcoming road segment; and
      predicting, whether the vehicle, based on the vehicle state data and a difference in a predicted level of error formulated by a calculation of the road departure risk index will operate within an acceptable path in the upcoming road segment; and
   tracking, by the processor, the vehicle in the upcoming road segment based on vehicle navigation data to provide at least one adaptive alert of the one or more adaptive alerts based on a prediction of the road departure risk on the estimated vehicle path in the upcoming road segment.

2. The method of claim 1, further comprising:
   calculating by the processor, the road departure risk index with the loss of at least one input of sensor data comprising image sensor data from a vehicle camera.

3. The method of claim 2, further comprising:
   estimating, by the processor, the road departure risk in an upcoming roadway segment based on the vehicle navigation data, the estimated vehicle path, and the vehicle state data with the loss of image sensor data from the vehicle camera caused by a weather condition.

4. The method of claim 3, further comprising:
   in response to determining of the low visibility condition, alerting, by the processor via the at least one adaptive alert of the one or more adaptive alerts, for an avoidance of a road excursion action by the driver in the upcoming road segment.

5. The method of claim 4, further comprising:
   escalating, by the processor, the at least one adaptive alert of the one or more adaptive alerts based on calculations of the road departure risk index while operating in the upcoming road segment.

6. The method of claim 5, further comprising:
   systematically providing, by the processor, information via the at least one adaptive alert about the road departure risk based on the road departure risk index in the upcoming roadway segment.

7. The method of claim 1, wherein the at least one adaptive alert comprises at least one icon indicating activation of the one or more adaptive alerts based on the road departure risk, and a low visibility mode of vehicle operation wherein the low visibility mode of vehicle operation comprises a loss of input of image sensor data to the vehicle controller.

8. The method of claim 1, wherein
   the vehicle navigation data comprises global navigation satellite system (GNSS) data that includes data of at least roadway segment curvature.

9. The method of claim 1, wherein
   the at least one adaptive alert is configured when displayed to incorporate road condition information and to change when displayed in accordance with the road departure risk associated with at least a roadway surface condition.

10. The method of claim 1, further comprising:
    configuring, by the processor, the at least one adaptive alert by a preference of the driver; and
    adjusting, by the processor, the at least one adaptive alert based on a perceived risk by the driver in an operating environment, and by the preference of the driver of a vehicle distance to a roadway edge in an upcoming roadway segment.

11. The method of claim 1, further comprising:
    displaying, by the processor, on a vehicle navigation display a location for stoppage of the vehicle until the low visibility condition is improved or the vehicle is no longer operating in a low visibility mode of vehicle operation.

12. The method of claim 1, further comprising:
    in response to determining the low visibility condition, notifying, by the processor via the at least one adaptive alert, that a lane keep assist feature is not operable and presenting an option to enable a navigation vehicle guidance assist feature.

13. A vehicle, comprising:
    at least one sensor that provides sensor data within a vehicle environment as vehicle environment data and about a vehicle state as vehicle state data; and
    a controller that, with a processor and based on the sensor data, is configured to:
       receive the vehicle state data and the vehicle environment data;
       determine, in response to engagement of at least one assist feature of the vehicle, whether the vehicle is operating in an upcoming road segment with at least a low visibility condition based on the vehicle state data and the vehicle environment data to cause a loss of at least one input of sensor data to the vehicle controller that operates the at least one assist feature;
       activate, in response to the loss of at least one input of sensor data, one or more adaptive alerts based on a road departure risk of the vehicle, and driver use of the at least one assist feature in the upcoming road segment, wherein the road departure risk is determined by calculating a road departure risk index that compares an estimated vehicle path based on the vehicle state data with a probabilistic vehicle path for the upcoming road segment, and predict whether the vehicle based on the vehicle state data and a difference in a predicted level of error formulated by a calculation of the road departure risk index will operate within an acceptable path in the upcoming road segment; and track the vehicle in the upcoming road segment based on vehicle navigation data to provide at least one adaptive alert of the one or more adaptive alerts based on a prediction of the road departure risk on the estimated vehicle path in the upcoming road segment.

14. The vehicle of claim 13, wherein the controller is configured to:
calculate the road departure risk index with the loss of at least one input of sensor data comprising image sensor data from a vehicle camera.

15. The vehicle of claim 14, wherein the controller is configured to:
estimate the road departure risk in an upcoming roadway segment based on the vehicle navigation data, the estimated vehicle path, and the vehicle state data with the loss of image sensor data from the vehicle camera caused by a weather condition.

16. The vehicle of claim 15, further comprising:
alert via the at least one adaptive alert of the one or more adaptive alerts in response to a determination of the low visibility condition for an avoidance of a road excursion action by the driver in the upcoming road segment.

17. The vehicle of claim 16, wherein the controller is configured to:
escalate the at least one adaptive alert of the one or more adaptive alerts based on calculations of the road departure risk index while operating in the upcoming road segment; and
provide information via the at least one adaptive alert about the road departure risk based on the road departure risk index in the upcoming roadway segment.

18. The vehicle of claim 13, comprising:
wherein the at least one adaptive alert comprises at least one icon indicating the activation of the one or more adaptive alerts based on the road departure risk, and a low visibility mode of vehicle operation wherein the low visibility mode of vehicle operation comprises loss of input of image sensor data to the vehicle controller;
wherein the vehicle navigation data comprises global navigation satellite system (GNSS) data that includes data of at least roadway segment curvature;
wherein the at least one adaptive alert is configured when displayed to incorporate road condition information and to change when displayed in accordance with the road departure risk associated with at least a roadway surface condition.

19. The vehicle of claim 13, wherein the controller is configured to:
configure the at least one adaptive alert by a preference of the driver; and
adjust the at least one adaptive alert based on a perceived risk by the driver in an operating environment, and by the preference of the driver of a vehicle distance to a roadway edge in an upcoming roadway segment.

20. A system comprising:
a non-transitory computer readable storage medium storing a program; and
a processing unit disposed in a vehicle comprising one or more processors configured to execute the program, to thereby:
receive vehicle state data and vehicle environment data;
determine, in response to engagement of at least one assist feature of the vehicle, whether the vehicle is operating in an upcoming road segment with at least a low visibility condition based on the vehicle state data and the vehicle environment data to cause a loss of at least one input of sensor data to a vehicle controller that operates the at least one assist feature;
activate, in response to the loss of at least one input of sensor data, one or more adaptive alerts based on a road departure risk of the vehicle, and driver use of the at least one assist feature in the upcoming road segment, wherein the road departure risk is determined by calculating a road departure risk index that compares an estimated vehicle path based on the vehicle state data with a probabilistic vehicle path for the upcoming road segment, and predict whether the vehicle will operate within an acceptable path in the upcoming road segment; and
track the vehicle in the upcoming road segment based on vehicle navigation data to provide at least one adaptive alert of the one or more adaptive alerts based on a prediction of the road departure risk on the estimated vehicle path in the upcoming road segment.

* * * * *